Oct. 19, 1926.  R. L. MORGAN  1,603,629

WORK HOLDER

Original Filed Feb. 3, 1921    4 Sheets-Sheet 1

Inventor
Ralph L. Morgan
By Attorneys

Oct. 19, 1926.
R. L. MORGAN
WORK HOLDER
Original Filed Feb. 3, 1921      4 Sheets-Sheet 2
1,603,629
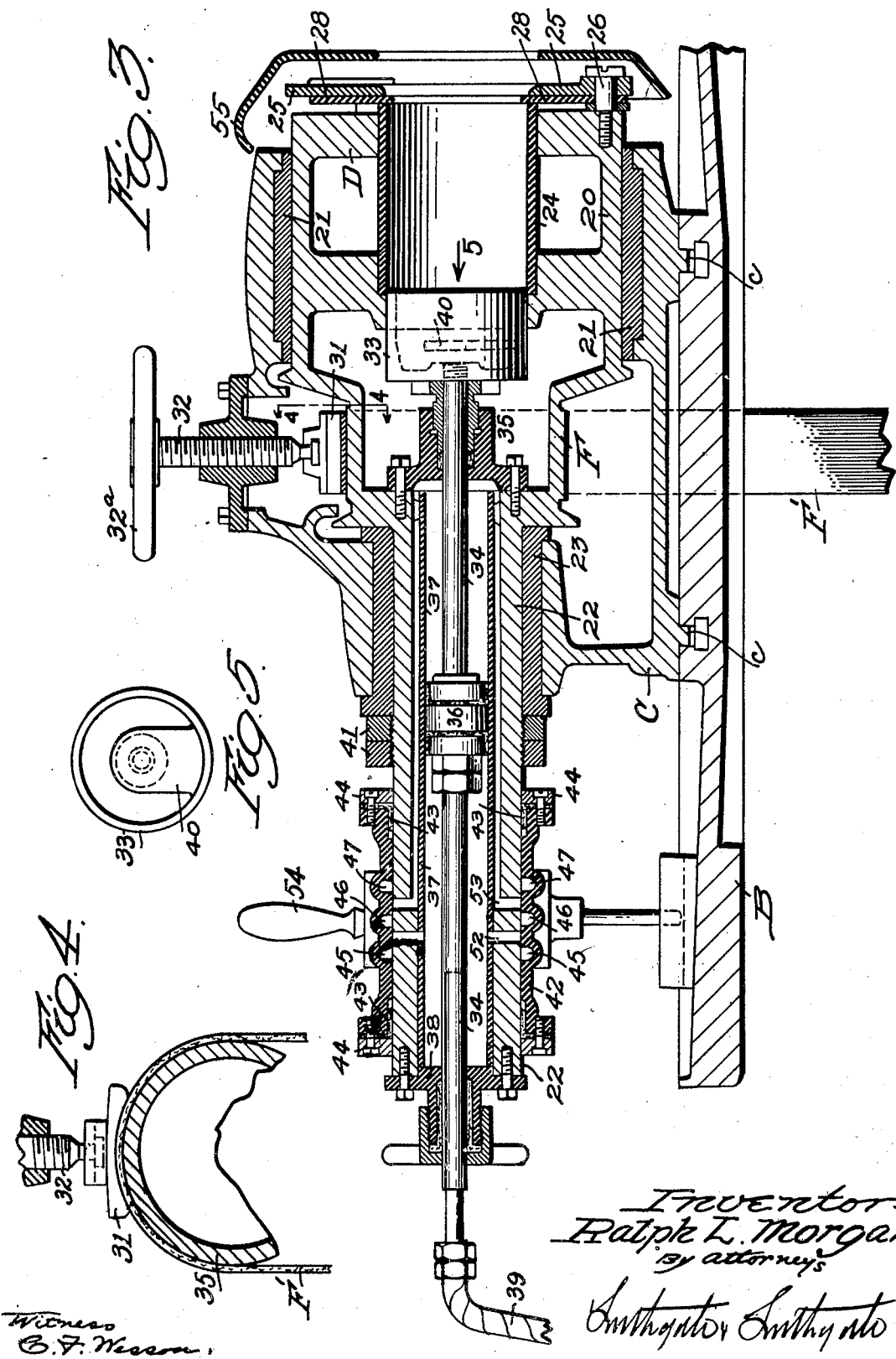

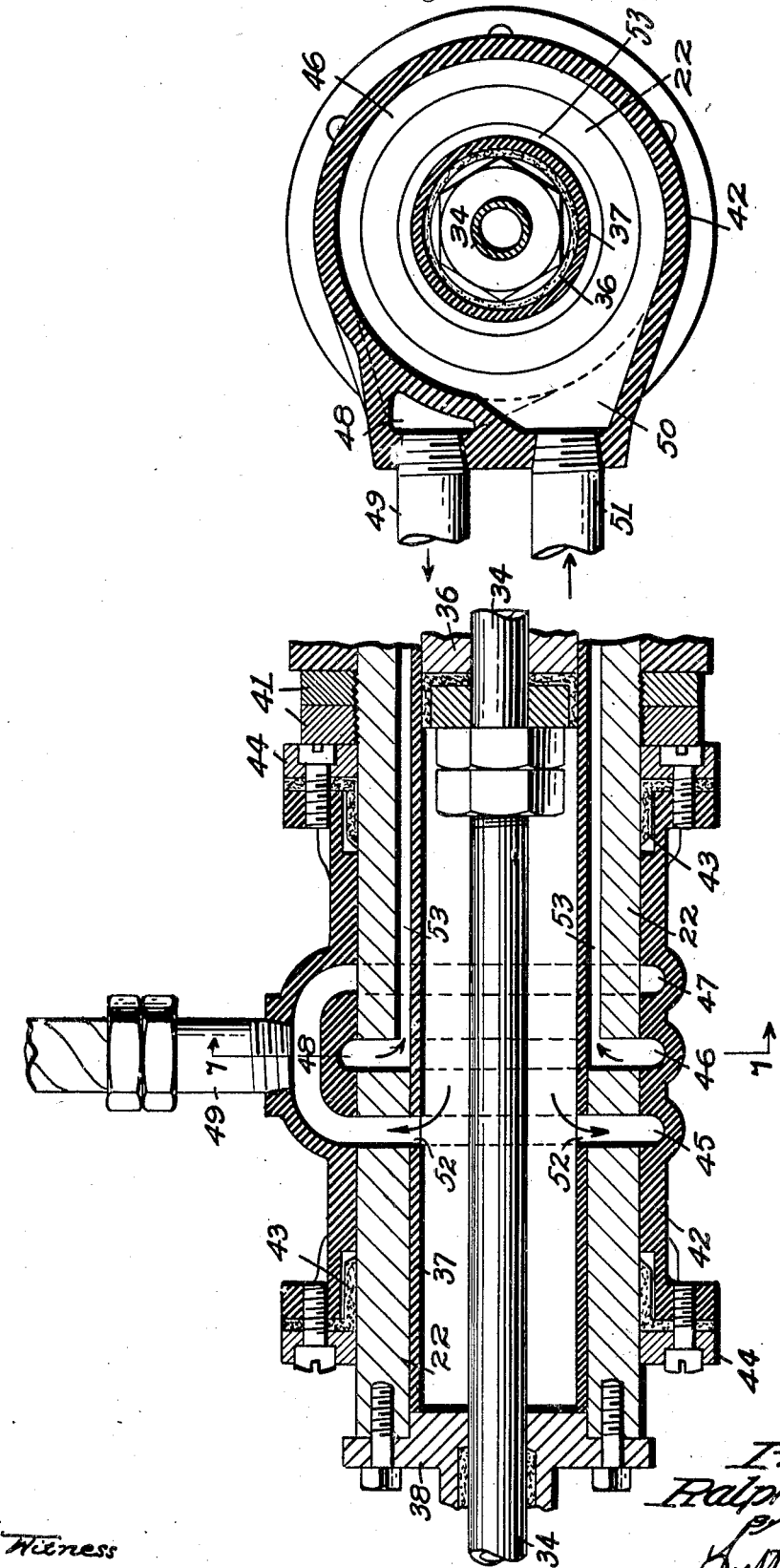

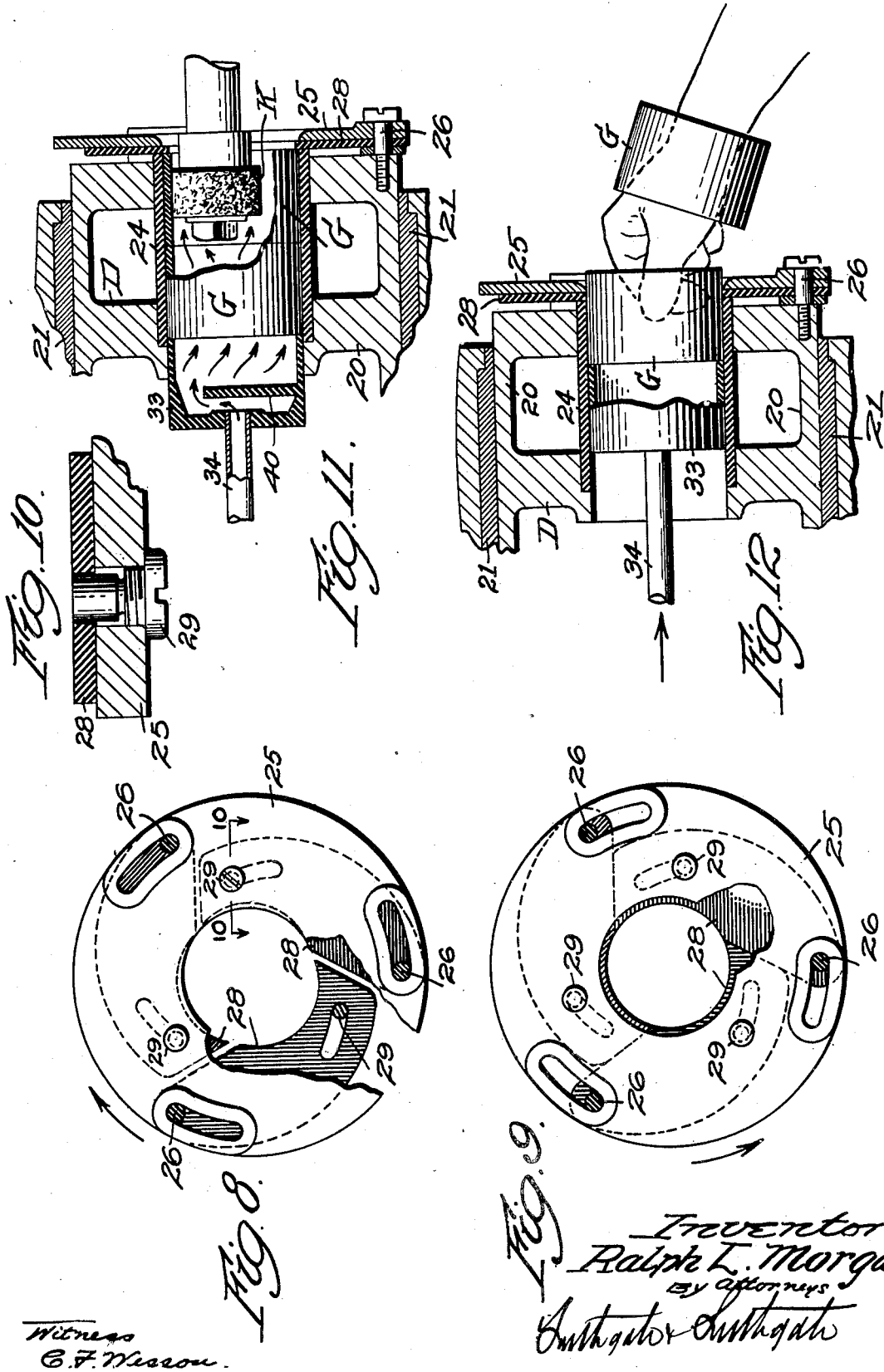

Patented Oct. 19, 1926.

1,603,629

UNITED STATES PATENT OFFICE.

RALPH L. MORGAN, OF WORCESTER, MASSACHUSETTS, ASSIGNOR, BY MESNE ASSIGNMENTS, TO GREENFIELD TAP AND DIE CORPORATION, OF GREENFIELD, MASSACHUSETTS, A CORPORATION OF MASSACHUSETTS.

WORK HOLDER.

Application filed February 3, 1921, Serial No. 442,259. Renewed March 8, 1926.

The object of this invention is to provide a new and improved work holder particularly adapted to hold work which is to be operated upon internally.

The work holder has been designed especially for use as a part of or member of an internal grinding machine, such for example, as shown in an aplication for patent filed by me November 20, 1920, Serial No. 425,475.

The work holder consists of a rotatable hollow spindle having work retaining means comprising iris plates and means for opening and closing the same, consisting preferably of a rotary disc.

The work to be operated upon generally consists of hollow bushings and usually two or more of such bushings are operated upon at a time. The bushings are held in place by a fluid actuated pusher which is employed to force the bushings endwise against said work retaining means, and which pusher also is employed for the purpose of ejecting the bushings after they have been ground.

The invention also consists of improved points of construction hereinafter described and more particularly pointed out in the claims.

Referring to the drawings and in detail:

Fig. 3 is a sectional elevation;

Fig. 4 is a cross sectional view on the line 4—4 of Fig. 3;

Fig. 5 is an end view of the ejecting pusher;

Fig. 6 is a sectional elevation on an enlarged scale of the controlling valve;

Fig. 7 is a cross sectional view thereof on the line 7—7 of Fig. 6;

Fig. 8 is an end view of the work retaining means in open position;

Fig. 9 is a simliar view with the parts in closed position;

Fig. 10 is a cross sectional view on an enlarged scale through the line 10—10 of Fig. 8;

Fig. 11 is a sectional elevation illustrating the grinding operation, and

Fig. 12 is a similar view showing how the work is ejected.

Figure 1:
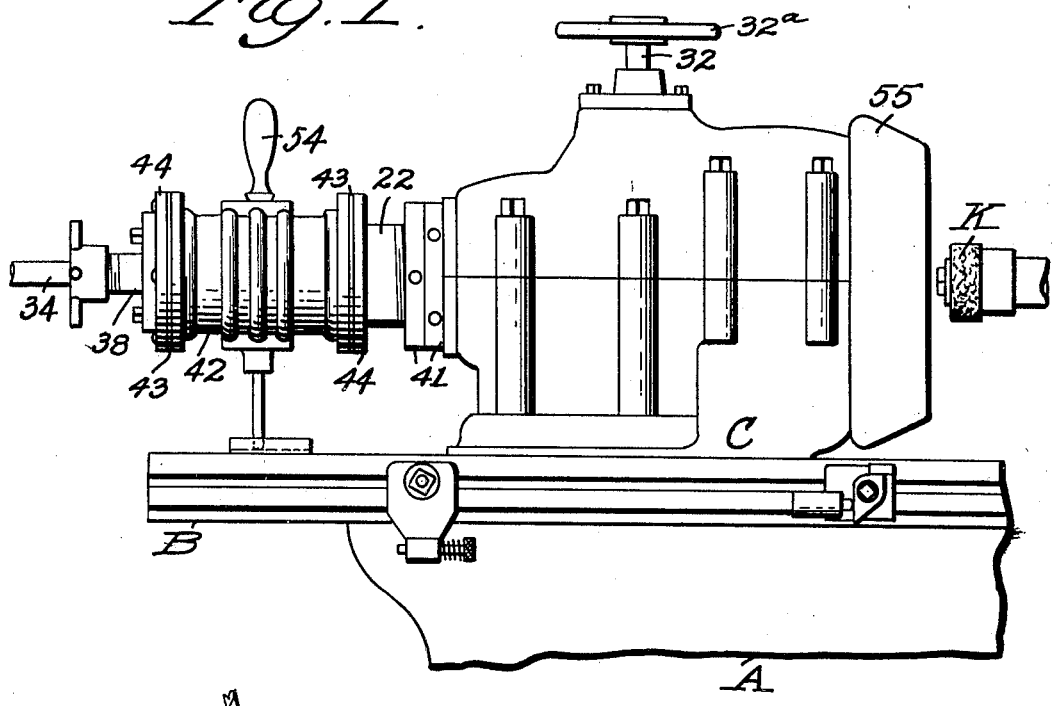
Fig. 1 is a side elevation of the work holder.
Figure 2:
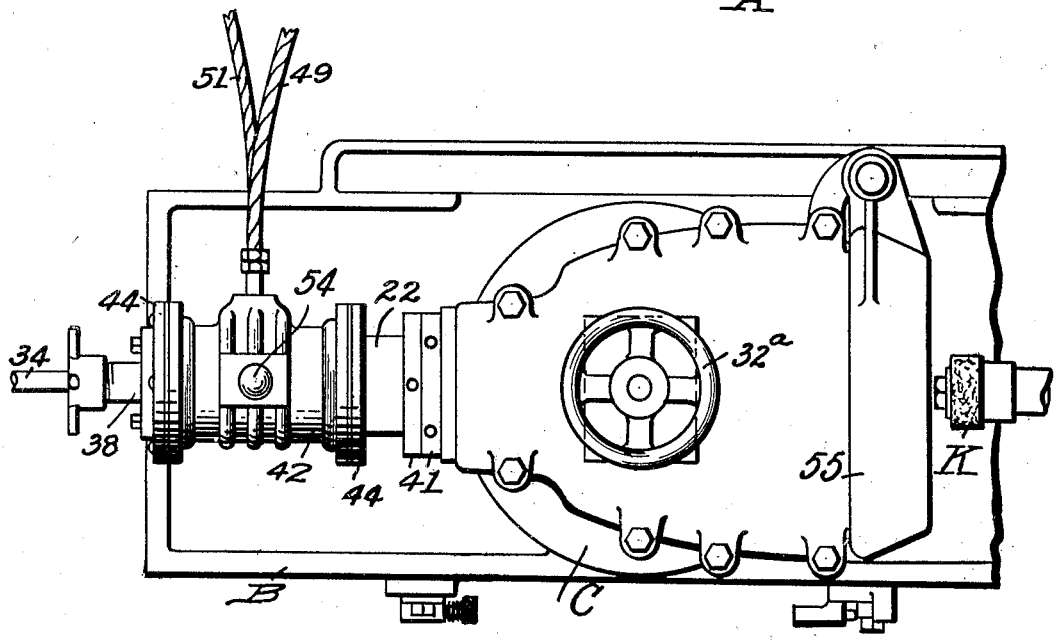
Fig. 2 is a plan view.

Referring to the drawings and in detail A designates the frame or base, fitted to slide on which is a work table B. A bearing block C is provided with an annular rib c fitted in a circular groove on the work table, which block can be clamped in desired angular position on the work table. D designates a spindle or quill, the portion F of which forms a driving pulley, which may be rotated by a suitable belt F'. The front or right hand end 20 of the spindle is enlarged and and is fitted in a bearing 21 secured in the bearing block C, and the extending quill 22 of the spindle is fitted in another bearing block 23 also carried by the bearing block C. The bearing block C is made in sections bolted together so that the bearings can be held in position.

An accurately ground work holding bushing 24 is designed to receive one or more bushings G—G which are to be ground internally. These bushings G—G are slipped into the work holding bushing 24 and are kept in place axially by the work retaining mechanism now to be described.

This mechanism consists of a disc 25 which is mounted on three screws 26 secured in the right hand end of the spindle, the disc 25 having partial circumferential slots so that it can have a partial rotation on said screws. Pivoted on the three screws 26 are three iris plates 28 each of which has a cam slot in which is received the end of a stud 29 screwed or fastened in the disc 25. These parts are shown in Fig. 8 with the disc 25 turned as far as it will go in a contraclockwise direction. When the parts are in this position the iris plates will be swung on the screws 26 as pivots so that their inner edge will be retracted axially. When the disc 25 is turned in clockwise direction from the position shown in Fig. 8 to the position shown in Fig. 9, the iris plates will be swung inwardly on the screws 26 so that the inner edges thereof will come in front of the work G which is to be ground as represented in Fig. 11. The inner edges of the iris plates are turned so that when they are in the position shown in Fig. 9, they will come together to form a circumferential shoulder which will come at the right of the work as shown in Fig. 11. This circumferential shoulder is slightly larger in internal diameter than the inside diameter of the work so that the grinding wheel K will clear the same. The bushings G—G to be ground are placed in position in the work holding bushing 24, with the disc 25 in the position shown in Fig. 8 and then the disc is moved to the position shown in Fig. 9 which will move the iris plates inwardly, thus forming the retaining shoulder previously described.

In case the disc 25 should stick or should be difficult to operate, a clamp 31 carried at the end of a screw 32 threaded in a cup secured to the holder C and having a hand wheel 32ª can be brought down on the driving belt to hold the spindle D from rotating so that force can be applied to turn the disc 25 while the spindle is held from rotation.

The mechanism for clamping and ejecting the work will now be described.

The same consists of a hollow piston-like pusher 33 fitted to slide in the work holding bushing 24. A pipe or hollow rod 34 is secured to this pusher. This pipe 34 passes through a stuffing box 35 secured inside the spindle and a piston 36 is secured on the same which piston slides in a quill or cylinder 37 tightly fitted in the left hand end of the quill 22. A stuffing box 38 is formed on the end of the quill 22 and a pipe 34 passes out through the same, a flexible hose 39 being attached to the end of the pipe 34 so that lubricating fluid can be fed into the work holding bushing 24 to lubricate the work as it is ground by the grinding wheel K. A baffle plate 40 is preferably formed in the pusher 33 to give an even flow of the liquid to the work. The spindle is kept in place axially in its bearings by nuts 41—41 screwed on the same. To control the operation of the pusher 33 a cylindrical valve 42 is fitted on the quill 22. This cylindrical valve has packings 43—43 at its ends held in place by collars 44 held by screws to the ends of the valve. The valve is provided with three annular grooves 45, 46 and 47, the two outer grooves 45 and 47 being connected by a passage 48 to which an exhaust pipe 49 is attached and the middle groove 46 is connected to a passage 50 to which a pressure pipe 51 is attached. The pipes 51 and 49 are connected to a source of pressure and to an exhaust respectively by flexible hose. A set of holes 52 is bored through the quill 22 and the cylinder 37 to connect to the inside of said cylinder 37 and another set of holes 53 is bored axially through the quill 22 to connect to the annular space between the cylinder 37 and the quill 22 at the right, the stuffing box 35 being bored out at the right of said holes to permit a flow from said holes 53 to the right hand end of the cylinder 37. An operating handle 54 is provided for the valve. When the valve is moved to its right hand position as shown in Fig. 6 fluid under pressure will pass through the holes 53 and the annular space between the quill 22 and the cylinder 37 and will act on the right hand side of the piston 36 and will force the piston to the left, the fluid at the left of the piston passing to the exhaust through the holes 52. When the valve is in its middle position as shown in Fig. 3 both sets of holes 52 and 53 will be closed, and no pressure will be exerted to move the piston. When the valve is moved to its left hand position, fluid under pressure will be admitted to the holes 52 to the left of the piston 36 which will move the piston to the right and the fluid at the right of the piston will exhaust through the holes 53. Thus, by moving the valve to its right hand position the piston will move to the left, by moving the valve to its left hand position the piston will move to the right, and by leaving the valve in its intermediate position the piston will be relieved from pressure.

The term "fluid" is to be understood as broad enough to include both liquids and gases or vapors, oil, water and compressed air being instances of suitable operating fluids.

A door or water guard 55 is pivoted to the bearing block C, which door is provided to direct the issuing grinding compound down onto the table of the machine. This door swings out of the way when the work is to be ejected. The details and operation of this door are shown, described and claimed in an application filed on even date herewith by Myles Morgan, Serial No. 442,258.

In operation the valve is moved to its right hand position and the disc 25 is moved to the position shown in Fig. 8. This will open the iris plates and will cause the pusher to move to its left hand position. The bushings G—G to be ground are then inserted in the work holding bushing 24. Then the disc 25 is moved to the position shown in Fig. 9, inwardly closing the iris plates and placing a work holding shoulder at the right of the bushings to be ground. Then the cylindrical valve is moved to the left. This causes the fluid and pressure to force the pusher to the right to engage the left hand end of the bushings to be ground. The bushings will thus be held rigidly in position by the pressure of the pusher forcing the same against the closed iris plates. It will be noted that the bushings to be ground will be held in this position entirely by end thrust whereby they will not be distorted circumferentially for the grinding operation. The spindle is then set in rotation, the work table is moved back and forth and the grinding wheel is adjusted to perform the grinding operation. When the grinding operation is completed, the valve is moved to the right and the fluid under pressure will then force the pusher to the left relieving the strain on the bushings G—G. The disc 25 is then moved to the position shown in Fig. 8 withdrawing the iris plates from the right of the bushings. The valve is then moved to the left and the fluid under pressure will force the bushings G—G to the right and will eject the same as shown in Fig. 12. Thus, the bushings to be ground can be quickly placed in position, accurately held in place by end thrust during the grinding operation, and quickly ejected after the grinding operation. Thus the production of the machine can be increased by this rapid handling of the work.

The details and arrangements herein shown and described may be greatly varied by a skilled mechanic without departing from the scope of my invention as expressed in the claims.

Having thus described my invention, what I claim and desire to secure by Letters Patent is:—

1. In a machine tool, a work holder comprising a rotatable work supporting member having a recess at one end thereof to receive the work, a plurality of plates pivotally mounted at the end of said supporting member, and an actuating device also mounted on said member and connected to said plates, said device being effective by relative angular movement to advance said plates toward the axis of said work holder to form an annular flange about the end of said recess, and means to force the work axially against the flange thus formed by said plates and to hold the work in position for the operation of the machine thereon.

2. In a machine tool, a work holder comprising a rotatable work supporting member having a recess at one end thereof to receive the work, a plurality of plates pivoted at the end of said supporting member, a disc mounted for limited angular movement at the end of said supporting member and having a pin and cam slot connection with each of said plates, said disc being effective by relative angular movement thereof to advance said plates to form an annular flange about the end of said recess, and means to force the work axially against the flange thus formed by said plates and to hold the work in position for the operation of the machine thereon.

3. A work holder comprising a rotatable hollow spindle having work-retaining means consisting of iris plates, and means for operating the same, and means for temporarily holding or clamping the spindle from rotation during the adjustment of said plates.

4. In a machine tool, a work holder comprising a rotatable work supporting member having a recess at one end thereof to receive the work, means to retain the work in said recess and prevent axial outward movement thereof, and an axially movable pusher effective to force the work along said recess and against said work retaining means to clamp the work in position for the operation of said machine thereon.

5. A work holder comprising a rotatable hollow spindle having work-retaining means which can be moved into and out of operative position to prevent outward movement of the work in said spindle, and an axially moving pusher for forcing the work axially against said work-retaining means to hold the work in operative position for ejecting the work when said work-retaining means is moved to inoperative position.

6. In a machine tool, a work holder comprising a rotatable work supporting member having a recess at one end thereof to receive the work, means to retain the work in said recess and prevent axial outward movement thereof, and an axially movable pusher effective to force the work along said recess and against said work retaining means to clamp the work in position for the operation of said machine thereon, said pusher being operated by fluid pressure and having an opening therethrough by which lubricating fluid may be conducted to the work.

7. In a machine tool, a work holder comprising a rotatable work supporting member having a recess at one end thereof to receive the work, means to retain the work in said recess and prevent axial outward movement thereof, and an axially movable pusher effective to force the work along said recess and against said work retaining means to clamp the work in position for the operation of said machine thereon, and a sliding cylin- hollow to permit the introduction of lubricating fluid to the work and having an enlarged outer end with a baffle plate mounted therein to uniformly distribute said lubricating fluid to the work.

8. In a machine tool, a work holder comprising a rotatable work supporting member having a recess at one end thereof to receive the work, means to retain the work in said recess and prevent axial outward movement thereof, an axially movable pusher effective to force the work along said recess and against said work retaining means to clamp the work in position for the operation of said machine thereon, and a sliding cylindrical valve mounted on said rotatable work supporting the member and effective to control the axial movement of said pusher by regulating the flow of fluid under pressure thereto.

In testimony whereof I have hereunto affixed my signature.

RALPH L. MORGAN.